United States Patent
Lee et al.

(10) Patent No.: US 12,499,033 B2
(45) Date of Patent: Dec. 16, 2025

(54) APPARATUS FOR AND METHOD OF GENERATING A TEST CASE FOR AN ADVANCED DRIVER ASSISTANCE SYSTEM

(71) Applicant: HYUNDAI AUTOEVER CORP., Seoul (KR)

(72) Inventors: JeongAh Lee, Seoul (KR); YuJung Cho, Seoul (KR); YooJung Jung, Seoul (KR); EunHyung Cho, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 207 days.

(21) Appl. No.: 18/538,697

(22) Filed: Dec. 13, 2023

(65) Prior Publication Data
US 2024/0211382 A1 Jun. 27, 2024

(30) Foreign Application Priority Data
Dec. 21, 2022 (KR) .................. 10-2022-0180427

(51) Int. Cl.
G06F 11/3668 (2025.01)
G01S 17/89 (2020.01)
G06V 20/56 (2022.01)

(52) U.S. Cl.
CPC .......... *G06F 11/3684* (2013.01); *G01S 17/89* (2013.01); *G06V 20/56* (2022.01)

(58) Field of Classification Search
CPC .................................. G06F 11/3668
See application file for complete search history.

(56) References Cited

U.S. PATENT DOCUMENTS

| 11,966,673 | B2* | 4/2024 | Kristensen | G06N 3/045 |
| 2018/0273030 | A1* | 9/2018 | Weldon | G01S 13/931 |
| 2020/0074266 | A1* | 3/2020 | Peake | G06V 10/764 |
| 2023/0104453 | A1* | 4/2023 | Asghari | G01S 17/06 |
| | | | | 356/5.09 |

FOREIGN PATENT DOCUMENTS

KR 102221864 B1 3/2021

\* cited by examiner

*Primary Examiner* — Jae U Jeon
(74) *Attorney, Agent, or Firm* — Lempia Summerfield Katz LLC

(57) ABSTRACT

An apparatus for generating a test case for an advanced driver assistance system (ADAS). The apparatus includes a communication interface and a processor connected to the communication interface. The processor is configured to generate virtual light detection and ranging (LIDAR) data by performing a process of receiving, via the communication interface, raw data generated using a LIDAR, detecting an object contained in the raw data, and randomly arranging LiDAR data within a boundary of the object.

12 Claims, 5 Drawing Sheets

<N = 5>

< n = 2 >

< X = 2 >
₅C₂

< X = 3 >
₅C₃

< X = 4 >
₅C₄

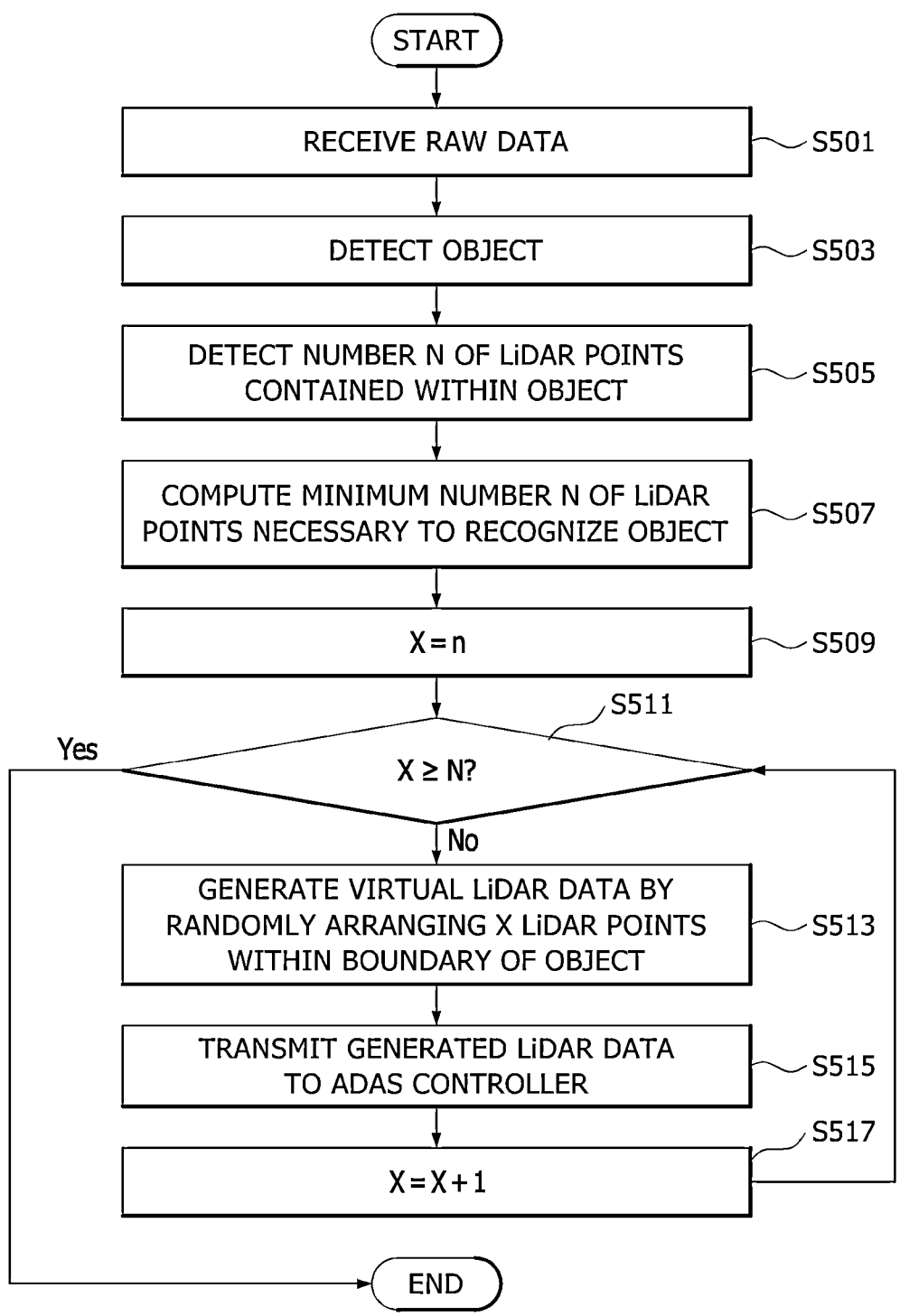

APPARATUS FOR AND METHOD OF GENERATING A TEST CASE FOR AN ADVANCED DRIVER ASSISTANCE SYSTEM

CROSS-REFERENCE TO RELATED APPLICATION

This application claims the benefit of and priority to Korean Patent Application No. 10-2022-0180427, filed on Dec. 21, 2022, the entire contents of which are hereby incorporated by reference.

TECHNICAL FIELD

The present disclosure relates to an apparatus and a method for generating a test case for an advanced driver assistance system (ADAS).

BACKGROUND

Typically, vehicles are equipped with an ADAS that monitors front, rear, and side environments to assist a driver in driving and ensure the driver's safety. A simulation evaluation method such as hardware in the loop simulation (HILS) is used to evaluate whether or not the ADAS stably operates in various driving environments.

The ADAS uses a light detection and ranging (LiDAR) sensor to detect an object in the vicinity of the vehicle. The LiDAR sensor provides various recognition information, such as various raw data on the same obstacles, which vary according to the weather conditions or the steering of the vehicle. Therefore, when HILS verification is performed on the ADAS, various test cases are typically set up, and raw data corresponding to the test cases is generated.

However, in the related art, it is necessary to physically set up a corresponding environment and then scan that environment with the LIDAR sensor that generates law data. Therefore, it takes a considerable time and cost to generate LiDAR data used for the HILS verification of the ADAS.

SUMMARY

Various embodiments provide an apparatus and a method for generating a test case for an ADAS, the apparatus and the method being capable of generating various test cases for verification of an ADAS controller from raw data generated by a LIDAR sensor.

According to an embodiment of the present disclosure, an apparatus for generating a test case for an ADAS is provided. The apparatus includes a communication interface and a processor connected to the communication interface. the processor is configured to generate virtual LiDAR data by performing a process. The process includes receiving, via the communication interface, raw data generated using a LIDAR. The process also includes detecting an object contained in the raw data. The process additionally includes randomly arranging LiDAR data within a boundary of the object.

In an embodiment, the processor may be configured to detect a number of LiDAR points contained within the boundary of the object from the raw data.

In an embodiment, the processor may be configured to repeatedly perform detecting the number of LiDAR points contained within the boundary of the object while changing the number of LiDAR points within a range that does not reach the detected number of LIDAR points.

In an embodiment, the processor may be configured to compute a minimum number of LiDAR points necessary to recognize the object.

In an embodiment, the processor may be configured to repeatedly perform computing the minimum number of LiDAR points while changing the number of LiDAR points within a range that reaches or exceeds the minimum number of LiDAR points.

In an embodiment, the processor may be configured to compute the minimum number of LiDAR points by repeatedly performing a process of outputting the raw data to an ADAS controller, and checking whether or not the object is recognized by the ADAS controller, while decreasing the number of LiDAR points contained within the boundary of the object.

According to another embodiment of the present disclosure, a method for generating a test case for an ADAS using a LIDAR is provided. The method includes receiving, by a processor, raw data generated using a LIDAR. The method also includes detecting, by the processor, an object contained in the raw data. The method may further include generating, by the processor, virtual LiDAR data by performing a process of randomly arranging LiDAR points within the boundary of the object.

According to embodiments of to the present disclosure, various test cases are generated by processing the raw data generated using the LiDAR. The generated test cases are provided to the ADAS controller. Thus, HILS verification of the ADAS controller can be supported.

The present disclosure is not limited to the above-mentioned effect. From the following description, additional effects of the present disclosure should be clearly understood by a person of ordinary skill in the art to which the present disclosure pertains.

BRIEF DESCRIPTION OF THE DRAWINGS

FIG. 5 is a flowchart illustrating a method for generating a test case for an ADAS, according to an embodiment of the present disclosure.

DETAILED DESCRIPTION OF THE ILLUSTRATED EMBODIMENTS

Figure 1:
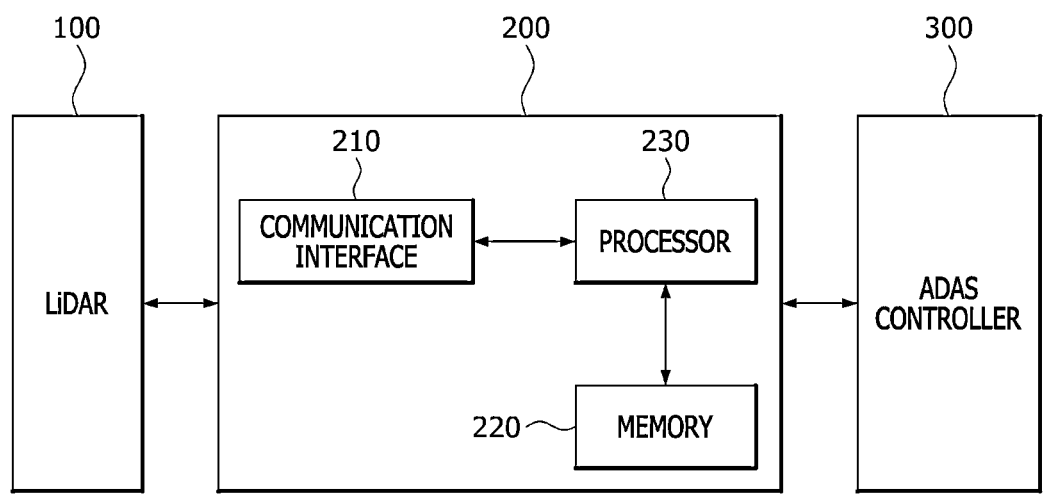
FIG. 1 is a block diagram illustrating an apparatus for generating a test case for an ADAS, according to an embodiment of the present disclosure.

An apparatus and a method for generating a test case for an advanced driver assistance system (ADAS) according to embodiments of the present disclosure are described below with the accompanying drawings. For clarity and convenience in description, thicknesses of lines, sizes of constituent elements, and the like may be illustrated in a non-exact proportion in the drawings. In addition, terms used hereinafter to refer to constituent elements, according to embodiments of the present disclosure are defined by considering their respective functions and may be adjusted according to a user's or manager's intentions or to established practices. Therefore, these terms should be contextually defined in light of the present specification.

In the following description, when a component, device, element, or the like of the present disclosure is described as having a purpose or performing an operation, function, or the like, the component, device, or element should be considered herein as being "configured to" meet that purpose or to perform that operation or function.

Figure 2:
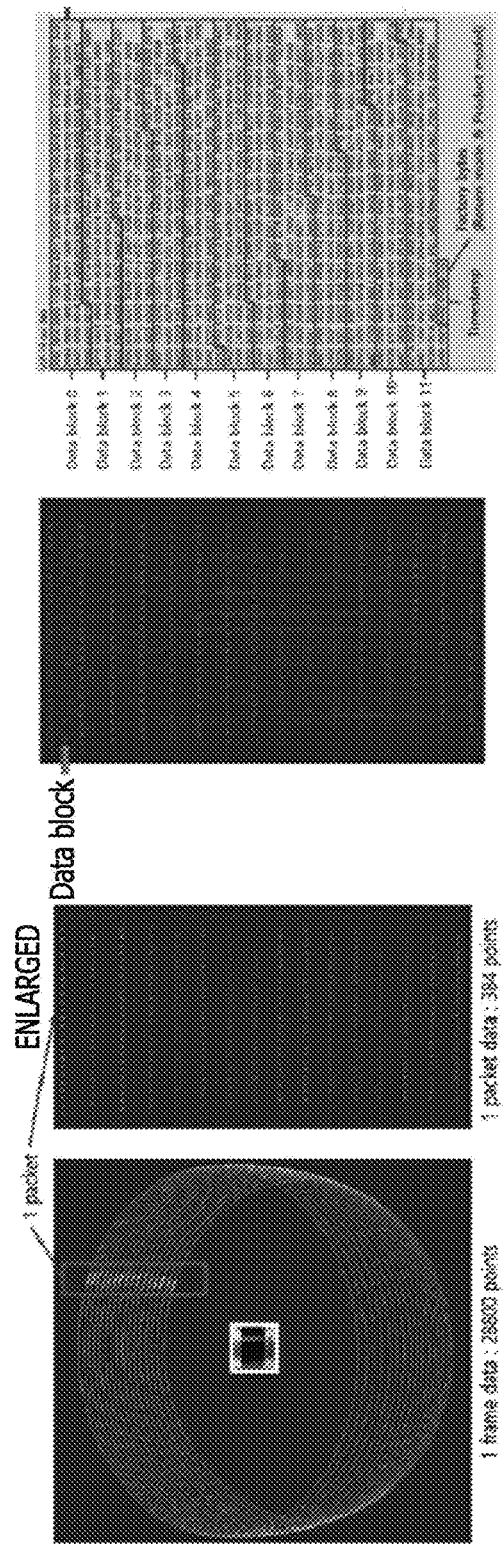
FIG. 2 illustrates views that for describing raw data and LiDAR points, according to an embodiment of the present disclosure.
Figure 3:
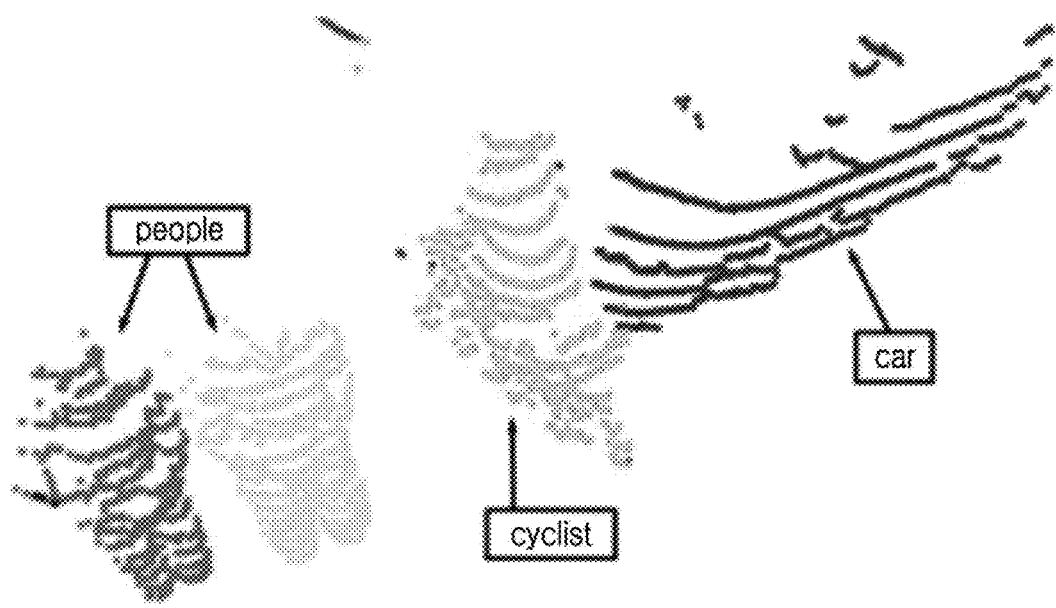
FIG. 3 is a view for describing the LiDAR points, according to an embodiment of the present disclosure.
Figure 4:
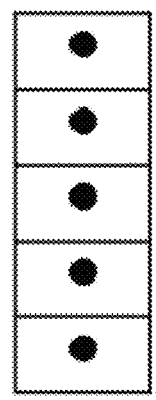
FIG. 4 is a diagram of a process of generating LiDAR data, according to an embodiment of the present disclosure.
Figure 4:
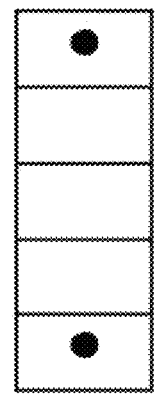
Figure 4:
Figure 4:
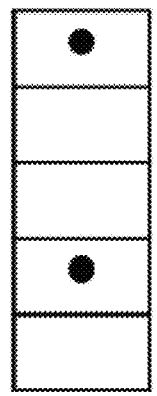
Figure 4:
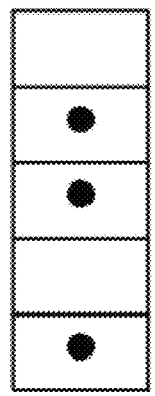
Figure 4:
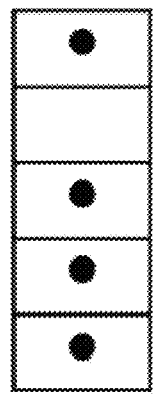

FIG. 1 is a block diagram illustrating an apparatus 200 for generating a test case for an ADAS, according to an embodiment of the present disclosure. FIG. 2 illustrates views for describing raw data and light detection and ranging (LIDAR) points, according to an embodiment of the present disclosure. FIG. 3 is a view for describing the LiDAR points, according to an embodiment of the present disclosure. FIG. 4 is a diagram of a process of generating LiDAR data, according to an embodiment of the present disclosure.

With reference to FIG. 1, the apparatus 200 for generating a test case for an ADAS according to an embodiment may include a communication interface 210, a memory 220, and a processor 230. The apparatus 200 may include various constituent elements in addition to constituent elements illustrated in FIG. 1, or may omit one or several of the constituent elements illustrated in FIG. 1.

The communication interface 210 may communicate with an external apparatus. The communication interface 210 may communicate with various types of external apparatuses according to various communication schemes. For example, the communication interface 210 may receive raw data generated using a LIDAR device 100 (e.g., LiDAR scanning device, LiDAR sensor, etc.) by communicating with the LiDAR device 100. A LIDAR device is sometimes referred to herein as simply "LiDAR". As illustrated in FIG. 2, the raw data generated using the LiDAR 100 may include information on LiDAR points corresponding to an object. The information may be obtained via scanning the surrounding area by the LIDAR 100. For example, the raw data may be composed of one (1) frame data unit containing information on a maximum of 28,800 LiDAR points. One frame data unit may be composed of 75 packet data units, and one packet data unit may contain information on a maximum of 384 LiDAR points. One packet data unit may be composed of 12 data blocks. As illustrated in FIG. 3, in a case where a pedestrian is present in an area scanned by the LiDAR 100, LiDAR points may form a point cloud indicated by "people". In a case where a person riding a bicycle is present on an area scanned by the LiDAR 100, LIDAR points may form a point cloud indicated by "cyclist". In a case where a vehicle is present on an area scanned by the LiDAR 100, LIDAR points may form a point cloud indicated by "vehicle".

Various information required while the processor 230 operates may be stored in the memory 220. In addition, various information generated while the processor 230 operates may be stored in the memory 220.

The processor 230 may be operatively connected to the communication interface 210 and the memory 220. The processor 230 may also be realized as a central processing unit (CPU), a microcontroller unit (MCU), or a system-on-chip (SOC). The processor 230 may be configured to control a plurality of hardware or software constituent elements connected thereto, by running an operating system or an application. The processor 230 may be configured to perform various data processing and computation, to execute at least one command stored in the memory 220, and to store data, resulting from the execution, in the memory 220.

The processor 230 receives the raw data, generated using the LIDAR 100, via the communication interface 210, detects an object included in the received raw data, and randomly arranges LiDAR points within a boundary of the detected object. By performing this processing, the processor 230 may generate virtual LiDAR data. The processor 230 may generate virtual LiDAR data by removing LiDAR points positioned within the boundary of the object and then randomly arranging LiDAR points within the boundary of the object. For example, the processor 230 may delete data corresponding to LiDAR points positioned within the boundary of the object from the raw data and may add data (i.e., data associated with new LiDAR points), that may have data values representing information on arbitrary positions with the boundary of the object, in place of the deleted data. In this manner, the processor 200 may randomly arrange LiDAR points within the boundary of the object. The processor 230 may add or delete LIDAR points to be arranged within the boundary of the object whenever necessary. In this manner, according to embodiments of the present disclosure, the raw data generated using the LiDAR 100 may be processed by deleting LiDAR points positioned within the boundary of the object and randomly arranging new LiDAR points with the boundary of the object. Consequently, even though a test environment is not actually established, it is possible to generate various test cases.

The processor 230 may repeatedly perform a process of detecting a number N of LiDAR points contained within the boundary of the object from the raw data and randomly arranging LiDAR points within the boundary of the object while changing the number of LiDAR points within a range that does not reach the detected number N of LiDAR points. The processor 230 may repeatedly perform a process in which LiDAR points within the boundary of the object are randomly arranged while decrementing the number of LiDAR points to be arranged within the boundary of the object from the number N of LIDAR points contained within the boundary of the object. For example, the processor 230 may perform a process of adding a number (N−1) of different data having data values representing information on arbitrary positions within the boundary of the object. The processor 230 may repeatedly perform this process while decrementing by one the number of subsequently added data. In this manner, according to embodiments of the present disclosure, when generating virtual LiDAR data, the number of LiDAR points to be arranged within an object is limited to be smaller than the number N of LiDAR points that are detected when the object is actually scanned by the LiDAR 100. Consequently, LiDAR data more similar to real-world data can be generated.

The processor 230 may repeatedly perform a process of computing a computed minimum number n of LiDAR points necessary to recognize an object and randomly arranging LiDAR points within the boundary of the object while changing the number of LiDAR points within a range that reaches or exceeds the computed minimum number n of LiDAR points. The processor 230 may repeatedly perform a process in which LiDAR points within the boundary of the object are randomly arranged while incrementing the number of LiDAR points to be arranged within the boundary of the object from the minimum number n of LiDAR points necessary to recognize the object. For example, the processor 230 may perform a process of adding the number n of different data having data values representing information on arbitrary positions within the boundary of the object. The processor 230 may repeatedly perform this process while incrementing by one the number of data that are subsequently added. In this manner, according to embodiments of the present disclosure, when generating virtual LiDAR data, the number of LiDAR points to be arranged within an object is limited to the minimum number n of LiDAR points necessary to recognize the object, or to more than the minimum number n. Consequently, LiDAR data can be prevented from being indiscreetly generated.

The processor 230 may repeatedly perform a process of inputting raw data to an ADAS controller 300 and checking whether or not an object is recognized by the ADAS controller 300, while decrementing the number of LiDAR points contained within the boundary of the object. Consequently, the processor 230 may compute the minimum number n of LiDAR points necessary to recognize the object. For example, the processor 230 may identify the number of LiDAR points with which an object becomes unrecognized. The processor 230 may compute, as the minimum number n of LiDAR points necessary to recognize the object, the number of LiDAR points that is greater by one than the identified number of LiDAR points.

The ADAS controller 300 may detect an object by processing raw data generated using the LiDAR 100. In a case where LiDAR points contained within the boundary of the object are not sufficient, in some cases, the ADAS controller 300 may recognize the object. According to embodiments of the present disclosure, while decrementing (removing) the number of LiDAR points positioned within the object, it may be checked whether or not the ADAS controller 300 recognizes the object. Through this process, the minimum number n of LiDAR points necessary for the ADAS controller 300 to recognize the object can be checked. For example, by removing LiDAR points, starting from a LIDAR point that is positioned relatively remotely from the boundary of the object, the processor 230 may check whether or not the ADAS controller 300 recognizes the object. However, the processor 230 is not limited to this checking process.

In the implementation example described above, the number of LiDAR points is changed within a range that does not reach the number N of LiDAR points contained within the boundary of the object, or within a range that reaches or exceeds the minimum number n of LiDAR points necessary to recognize the object. However, the processor 230 may also perform the above-described process while changing the number of LiDAR points to be arranged, in the range (X, n≤X<N) that reaches or exceeds the minimum number of LiDAR points necessary to recognize the object, but does not reach the number of LiDAR points contained within the boundary of the object.

For example, as illustrated in FIG. 4, it is assumed that the number N of LiDAR points contained within the boundary of an object is 5 and that the minimum number n of LiDAR points necessary to recognize the object is 2. Under this assumption, while changing the number of LiDAR points that are arranged, in the range (X, 2≤X<5) that is equal to or greater than 2, but smaller than 5, the processor 230 may repeatedly perform a process of randomly arranging LiDAR points within the boundary of the object. In this case, the number of test cases may be a total number of $_5C_2+_5C_3+_5C_4$.

The processor 230 may transmit generated LiDAR data to the ADAS controller 300 via the communication interface 210. The processor 230 may output the generated LiDAR data (i.e., a data case) to the ADAS controller 300 in such a manner that the generated LiDAR data is used for HILS verification of the ADAS controller 300. The processor 230 may transmit the generated LiDAR data to the ADAS controller 300 via Ethernet communication.

As described above, according to embodiments of the present disclosure, various data cases may be generated by processing raw data generated using the LiDAR 100, and the HILS verification of the ADAS controller 300 may be supported by providing the generated test cases to the ADAS controller 300. In addition, according to embodiments of the present disclosure, various test cases may be generated without a process of scanning an object with an actual LIDAR. Accordingly, a LIDAR recognition range that may vary widely according to weather, an environment, and a vehicular behavior condition may be readily verified.

FIG. 5 is a flowchart illustrating a method for generating a test case for an ADAS, according to an embodiment.

The method for generating a test case for an ADAS according to an embodiment is described below with reference to FIG. 5. One or several of steps or operations described below may be performed in a different order from the one described below or may be omitted. Specific descriptions of constituent elements described above may be omitted hereinafter. The primary focus is on describing an example time series configuration of the steps or operations.

In a step or operation S501, the processor 230 may receive raw data generated using the LiDAR 100 via the communication interface 210.

In a step or operation S503, the processor 230 may detect an object contained in the raw data.

In a step or operation S505, the processor 230 may detect the number N of LiDAR points contained within the boundary of the object.

In a step or operation S507, the processor 230 may compute the minimum number n of LiDAR points necessary to recognize the object.

In a step or operation S509, the processor 230 may set n as an initial value of the number X of LiDAR points to be arranged.

In a step or operation S511, the processor 230 may determine whether or not X is equal to or greater than N.

In a step or operation S513, in a case where X is neither equal to nor greater than N, the processor 230 may generate virtual LiDAR data by performing a process of randomly arranging X LiDAR points within the boundary of the object. The step or operation S513 may be repeatedly performed the number of times preset by a user.

In a step or operation S515, the processor 230 may transmit generated LiDAR data to the ADAS controller 300 via the communication interface 210.

In a step or operation S517, the processor 230 may increment by one the number of LiDAR points to be arranged, the processor 230. The process may the return to the step or operation S511. In the step or operation S517, the processor 230 may set (X+1) as new X.

In a case where X is equal to or greater than N, the processor 230 may end this process.

As described above, the apparatus and the method for converting sensor information into image information according to embodiments of the present disclosure can generate various test cases by processing the raw data generated using the LiDAR 100 and may support the HILS verification of ADAS controller 300 by providing the generated test cases to the ADAS controller 300.

Features of embodiments of the present disclosure, which are described in the present specification, may be realized in the form of, for example, a method, a process, an apparatus, a software program, a data stream, or a signal. The features, although described in terms of realization in a single form (for example, described as only a method), may also be realized in other forms (for example, an apparatus or a program). The apparatus may be realized in the form of adequate hardware, software, firmware, or the like, or a combination thereof. The method may be realized in, for example, computers, microprocessors, or devices such as processors that typically refer to processing devices, including integrated circuits, programmable logic devices, and the like. The processors also include those that are used in computers, cellular phones, portable information terminals, personal digital assistants ("PDAs"), and other communication devices that facilitate communication of information between end users.

The embodiments of the present disclosure are described only in an illustrative manner with reference to the accompanying drawings. From the description of the embodiments, it should be clearly understood by a person of ordinary skill in the art to which the present disclosure pertains that various modifications may be made to the embodiments without departing from the scope and spirit of the present disclosure and that an embodiment equivalent thereto may be practiced. Therefore, the proper technical scope of the present disclosure should be as defined in the following claims.

What is claimed is:

1. An apparatus for generating a test case for an advanced driver assistance system (ADAS), the apparatus comprising:
    a communication interface; and
    a processor connected to the communication interface,
    wherein the processor is configured to generate virtual light detection and ranging (LIDAR) data by performing a process including:
        receiving, via the communication interface, raw data generated using a LiDAR,
        detecting an object contained in the raw data, and
        randomly arranging LiDAR data within a boundary of the object.

2. The apparatus of claim 1, wherein the processor is configured to detect a number of LiDAR points contained within the boundary of the object from the raw data.

3. The apparatus of claim 2, wherein the processor is configured to repeatedly perform detecting the number of LiDAR points contained within the boundary of the object while changing the number of LiDAR points within a range that does not reach the detected number of LiDAR points.

4. The apparatus of claim 2, wherein the processor is configured to compute a minimum number of LiDAR points necessary to recognize the object.

5. The apparatus of claim 4, wherein the processor is configured to repeatedly perform computing the minimum number of LIDAR points while changing the number of LiDAR points within a range that reaches or exceeds the minimum number of LiDAR points.

6. The apparatus of claim 4, wherein the processor is configured to compute the minimum number of LiDAR points by repeatedly performing a process of outputting the raw data to an ADAS controller, and checking whether or not the object is recognized by the ADAS controller, while decreasing the number of LiDAR points contained within the boundary of the object.

7. A method for generating a test case for an advanced driver assistance system (ADAS) using light detection and ranging (LIDAR), the method comprising:
    receiving, by a processor, raw data generated using a LIDAR;
    detecting, by the processor, an object contained in the raw data; and
    generating, by the processor, virtual LiDAR data by performing a process of randomly arranging LiDAR points within a boundary of the object.

8. The method of claim 7, further comprising, before generating the virtual LiDAR data, detecting, by the processor, a number of LiDAR points contained within the boundary of the object from the raw data.

9. The method of claim 8, wherein generating the virtual LIDAR data includes repeatedly detecting the number of LiDAR points contained within the boundary of the object while changing the number of LiDAR points within a range that does not reach the detected number of LiDAR points.

10. The method of claim 8, further comprising, before generating the virtual LiDAR data, computing, by the processor, a minimum number of LiDAR points necessary to recognize the object.

11. The method of claim 10, wherein generating the virtual LIDAR data includes repeatedly computing the minimum number of LIDAR points while changing the number of LiDAR points within a range that reaches or exceeds the minimum number of LiDAR points.

12. The method of claim 10, wherein computing the minimum number of LiDAR points includes repeatedly performing a process of outputting the raw data to an ADAS controller, and checking whether or not the object is recognized by the ADAS controller, while decrementing a number of LiDAR points contained within the boundary of the object.

* * * * *